United States Patent
Tan et al.

(10) Patent No.: US 7,650,433 B2
(45) Date of Patent: Jan. 19, 2010

(54) POWER MANAGEMENT FOR MULTI-INTERFACE DEVICE CLUSTERS

(75) Inventors: Kun Tan, Beijing (CN); Haitao Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 435 days.

(21) Appl. No.: 11/620,403

(22) Filed: Jan. 5, 2007

(65) Prior Publication Data

US 2008/0168160 A1    Jul. 10, 2008

(51) Int. Cl.
*G06F 15/16*      (2006.01)
*G06F 15/173*     (2006.01)
*G06F 15/177*     (2006.01)

(52) U.S. Cl. ............... 709/250; 713/300; 713/323; 709/223

(58) Field of Classification Search ........... 709/206, 709/250, 217–228; 713/300, 323
See application file for complete search history.

(56) References Cited

U.S. PATENT DOCUMENTS

| | | | |
|---|---|---|---|
| 6,359,872 B1 | 3/2002 | Mahany et al. | |
| 6,493,780 B2 | 12/2002 | Hsu | |
| 6,735,448 B1 | 5/2004 | Krishnamurthy et al. | |
| 6,985,755 B2 | 1/2006 | Cadieux et al. | |
| 6,990,593 B2 | 1/2006 | Nakagawa | |
| 6,999,800 B2 | 2/2006 | Peng et al. | |
| 7,340,615 B2 * | 3/2008 | Krantz et al. | 713/300 |
| 7,529,957 B2 * | 5/2009 | Krantz et al. | 713/323 |
| 2003/0210658 A1 | 11/2003 | Hernandez et al. | |
| 2004/0038707 A1 | 2/2004 | Kim | |
| 2004/0217881 A1 | 11/2004 | Pedyash et al. | |
| 2005/0047356 A1 | 3/2005 | Fujii et al. | |
| 2005/0093703 A1 | 5/2005 | Twitchell, Jr. | |
| 2005/0122927 A1 | 6/2005 | Wentink | |
| 2005/0135302 A1 * | 6/2005 | Wang et al. | 370/329 |
| 2005/0190714 A1 | 9/2005 | Gorbatov et al. | |

(Continued)

FOREIGN PATENT DOCUMENTS

GB    2415573 A    12/2005

OTHER PUBLICATIONS

Chen, et al., "Span: An Energy-Efficient Coordination Algorithm for Topology Maintenance in Ad Hoc Wireless Networks", Wireless Networks 8, 2002, pp. 481-494.

(Continued)

*Primary Examiner*—Haresh N Patel
(74) *Attorney, Agent, or Firm*—Lee & Hayes, PLLC

(57) ABSTRACT

Multi-interface devices with at least a high-power network interface and a low-power network interface may form into power management clusters. Power management clusters may be maintained over low-power networks associated with the low-power network interfaces. One or some relative few of the cluster participants may be designated lead devices. Designated lead devices participate in high-power networks as well as a low-power network of their power management cluster. Designated lead devices may monitor associated high-power networks for messages addressed to any participant in their power management cluster, and may notify a participant of the incoming message. In response, the participant may establish a high-power network connection to receive the message. In this way, each participant in the power management cluster receives a service quality benefit of a continuous high-power network connection, but only a relative few participants suffer the associated power expenditure at any given moment.

20 Claims, 6 Drawing Sheets

U.S. PATENT DOCUMENTS

| | | |
|---|---|---|
| 2005/0201291 A1 | 9/2005 | Gluck |
| 2005/0215274 A1 | 9/2005 | Matson et al. |
| 2005/0239518 A1* | 10/2005 | D'Agostino et al. ........ 455/574 |
| 2008/0168160 A1* | 7/2008 | Tan et al. .................... 709/223 |

OTHER PUBLICATIONS

Kravets et al., "Power Management Techniques for Mobile Communication", MOBICOM '98, ACM, pp. 157-168, Dec. 31.

Shih et al., "Wake on Wireless: An Event Driven Energy Saving Strategy for Battery Operated Devices", MOBICOM '02, Sep. 22-23, 2002, 12 pgs.

Woesner et al., "Power Saving Mechanisms in Emerging Standards for Wireless LANs: the MAC Level Perspective", IEEE Personal Communications Systems, Jun. 1998, 15 pages.

* cited by examiner

POWER MANAGEMENT FOR MULTI-INTERFACE DEVICE CLUSTERS

BACKGROUND

It has become common place for people to use computing devices to communicate with each other. From simple text and graphics to interactive multimedia environments including voice, animation and video, computing devices have gone beyond the traditional mobile phone to support a wide variety of modes of communication. There is a correspondingly wide variety of communication networks that connect such computing devices, each with characteristic advantages and disadvantages, and, in particular, each requiring a characteristic expenditure of power. A core concern of device and network designers, particularly for portable computing devices with limited power supplies, is to provide a rich communication feature set while operating within a power budget.

The proliferation of communication networks and network types has resulted in further challenges and opportunities. In particular, network users typically desire to utilize the lowest cost network that can provide a given communication feature set. For example, the increasing availability of relatively low cost wireless internet service has sparked a demand for mobile Voice over Internet Protocol (VoIP) service. However, implementation of a given communication feature set for a network not explicitly designed for that feature set typically involves engineering trade-offs, particularly with respect to device power expenditure.

The mobile VoIP service example illustrates the problem. Traditional mobile phones operate at a variety of power expenditure levels to minimize overall usage, for example, at a relatively low level when waiting for a call and at higher levels during a call. Handset network interface power levels are tuned to the relatively low bandwidth required for telephone quality voice. In contrast, computing devices supporting mobile VoIP service typically utilize a standard wireless internet connection, for example, in accordance with one of the Institute of Electrical and Electronics Engineers (IEEE®) 802.11 series of standards. Such standards are tuned for internet usage patterns as opposed to telephone call usage patterns, so that, for example, they may lack a suitable low power mode in which to wait for an incoming call thus quickly spending the device's power budget.

Rapid expenditure of a device's power budget effectively reduces service quality, particularly for mobile devices with limited power supplies. Unfortunately, current methods of ameliorating this problem can introduce further problems. For the mobile VoIP service example, a simple power saving mechanism between calls is to activate the device's network interface only periodically to check for an incoming call. However, this mechanism introduces a call response delay which also reduces service quality, albeit in a different way. Systems and methods are desirable that adapt to, for example, low cost networks in ways that minimize reduction in service quality.

SUMMARY

Multi-interface devices with at least a high-power network interface and a low-power network interface may form into power management clusters. Power management clusters may be maintained over low-power networks associated with the low-power network interfaces. One or some relative few of the cluster participants may be designated lead devices. Designated lead devices participate in high-power networks as well as a low-power network of their power management cluster. Designated lead devices may monitor associated high-power networks for messages addressed to any participant in their power management cluster, and may notify a participant of the incoming message. In response, the participant may establish a high-power network connection to receive the message. In this way, each participant in the power management cluster receives a service quality benefit of a continuous high-power network connection, but only a relative few participants suffer the associated power expenditure at any given moment. Lead device duty may be shared among power management cluster participants so as not to unduly tax any particular participant.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

Concomitant with the proliferation of networks and network types has been a proliferation of corresponding network interface types. Computing devices may utilize network interfaces to access network facilities. It is increasing common for a single computing device to incorporate more than one network interface. Such computing devices are referred to herein as multi-interface devices. For the purposes of this description a network interface may be classified as a high-power network interface or a low-power network interface, with a corresponding network classified as a high-power network and a low-power network, respectively. High-power network interfaces require higher power expenditure than low-power network interfaces during at least some part of a network protocol and/or comparatively over a period of time. In an embodiment of the invention, utilization of a device's high-power network interface is minimized by maintenance of a power management cluster through the device's low-power network interface.

Here and throughout this description, the mobile VoIP service example will prove illustrative of systems and methods in accordance with an embodiment of the invention. However, embodiments of the invention are not limited to improving mobile VoIP service. Consider a set of computing devices, each having at least a high-power network interface and a low-power network interface, and suppose each computing device utilizes its high-power network interface to provide mobile VoIP service to a user of the computing device. To minimize call response times, each device may maintain a high-power network connection although the full capabilities of the high-power network are not required except during a call. In an embodiment of the invention, at least some of the set of devices form a power management cluster over a low-power network (i.e., a network established through the low-power network interfaces of the devices), and the costs of maintaining high-power network connections are amortized among the participants of the power management cluster. Details are best described with reference to illustrative figures.

Figure 1:
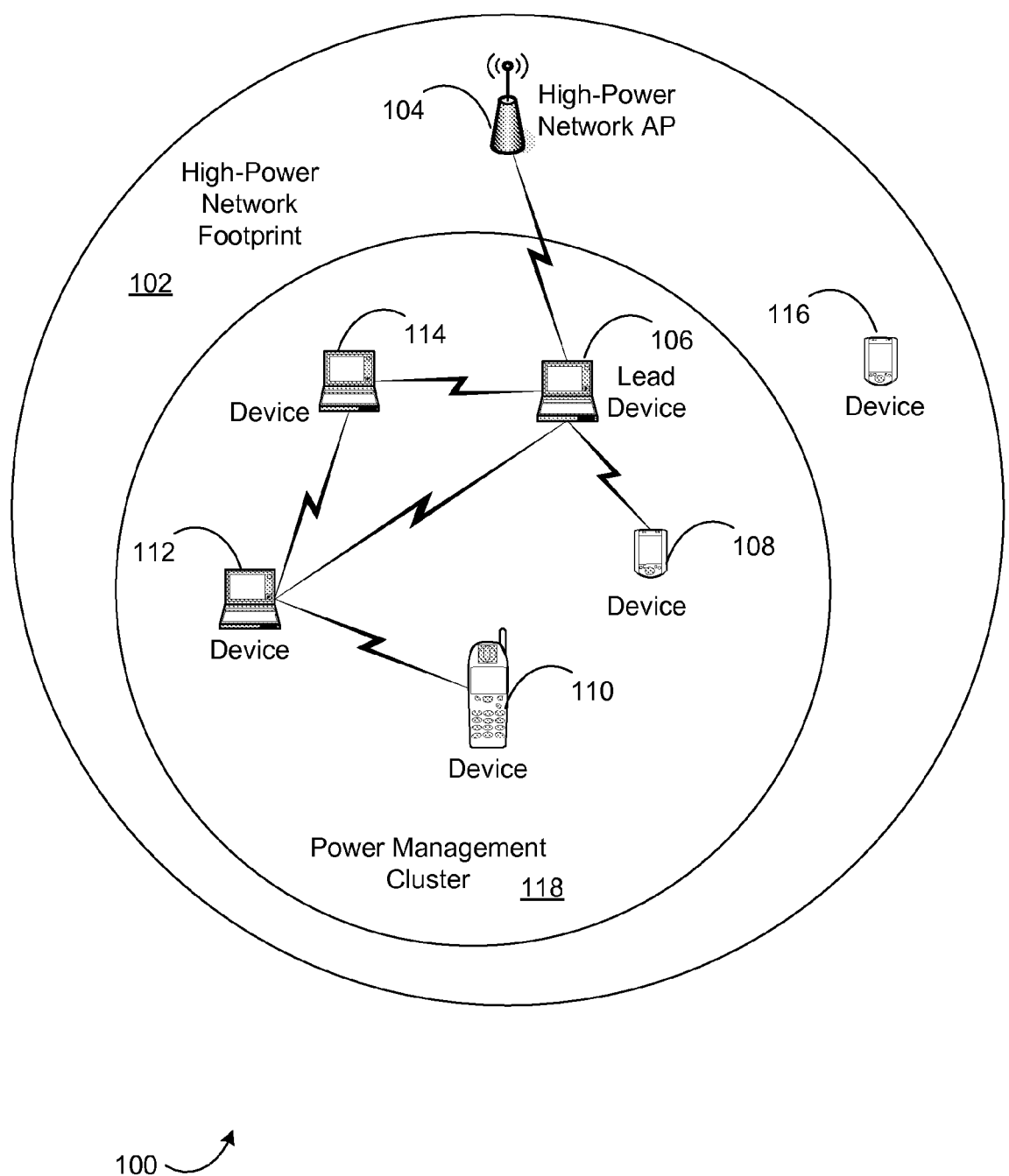
FIG. 1 is a schematic diagram depicting an example computer-implemented network for power management in accordance with an embodiment of the invention.

FIG. 1 depicts an example computer networking environment 100 in accordance with an embodiment of the invention. A high-power network footprint 102 is provided by a high-power network access point (AP) 104. For example, the high-power network associated with the high-power network AP 104 may be a wireless network in accordance with one of the IEEE® 802.11 series of standards. A set of multi-interface computing devices 106, 108, 110, 112, 114, 116 lie within the high-power network footprint 102, and thus each device 106, 108, 110, 112, 114, 116 is capable of establishing a high-power network connection with the high-power network AP 104. In accordance with an embodiment of the invention, a subset 106, 108, 110, 112, 114 of the devices 106, 108, 110, 112, 114, 116 have formed a power management cluster 118 over a low power network. For example, the low power network may be a wireless network in accordance with one of the Bluetooth® series of standards.

The power management cluster 118 may incorporate more than one type of low-power network. Any suitable network may serve as the high-power network 102 and/or one of the low-power networks incorporated into the power management cluster 118. Further examples of suitable networks include networks in accordance with the ZigBee™, "Ultra-Wideband" (UWB), "WiMAX", and further IEEE® networking standards. In the example depicted in FIG. 1, devices 106, 108, 110, 112, 114 are connected in a peer-to-peer (P2P) fashion. However, any suitable network topology may be incorporated into the power management cluster 118. In particular, the power management cluster 118 may utilize techniques utilized by self-organizing overlay networks to form.

The devices 106, 108, 110, 112, 114, 116 may be any suitable multi-interface device. Examples of suitable devices include portable computers, laptop computers, tablet computers, personal digital assistants (PDAs), mobile telephones, programmable consumer electronics devices, mobile computing devices with portable and/or limited power supplies, and suitable combinations thereof. Further examples of suitable devices include mainframes, servers, minicomputers, desktop computers, personal computers (PCs), workstations, routers, gateways, switches, hubs, computing devices with non-portable and/or unlimited power supplies and suitable combinations thereof. In the example shown in FIG. 1, device 116 has not joined the power management cluster 118 although it has the capability to do so. Example steps for discovering and joining power management clusters in accordance with an embodiment of the invention are described below in more detail with reference to FIGS. 3, 4 and 5.

In the example depicted in FIG. 1, device 106 has been designated as a lead device of the power management cluster 118. In accordance with embodiment of the invention, device 106 is connected not only to other devices 108, 112, 114 of the power management cluster 118 through its low-power interface, but also to the high-power network AP 104 through its high-power interface. In its role as lead device, device 106 monitors the high-power network AP 104 for high-power network messages addressed to any device in the power management cluster 118. If a message arrives at the high-power network AP 104 for another device 108, 110, 112, 114 in the power management cluster 118, the lead device 106 notifies the intended recipient 108, 110, 112, 114, and the notified device establishes a high-power connection to the high-power network AP 104 to retrieve the message. For example, the message may be notification of an incoming VoIP call.

Devices 108, 110, 112, 114 in the power management cluster 118 other than the lead device 106 need not maintain a high-power connection to the high-power network AP 104 in order to monitor for incoming messages. In an embodiment of the invention, this results in a significant power savings for the individual devices 108, 110, 112, 114 as well as for the power management cluster 118 considered as a whole. In addition, the role of lead device may be shared among the devices 106, 108, 110, 112, 114 of the power management cluster 118 so as to maximize an operational lifetime of each individual device 106, 108, 110, 112, 114 and/or the power management cluster 118 considered as a whole. Example steps for designating lead devices of power management clusters in accordance with an embodiment of the invention are described below in more detail with reference to FIG. 6. Although not shown in FIG. 1, power management clusters such as the power management cluster 118 may have more than one lead device.

Figure 2:
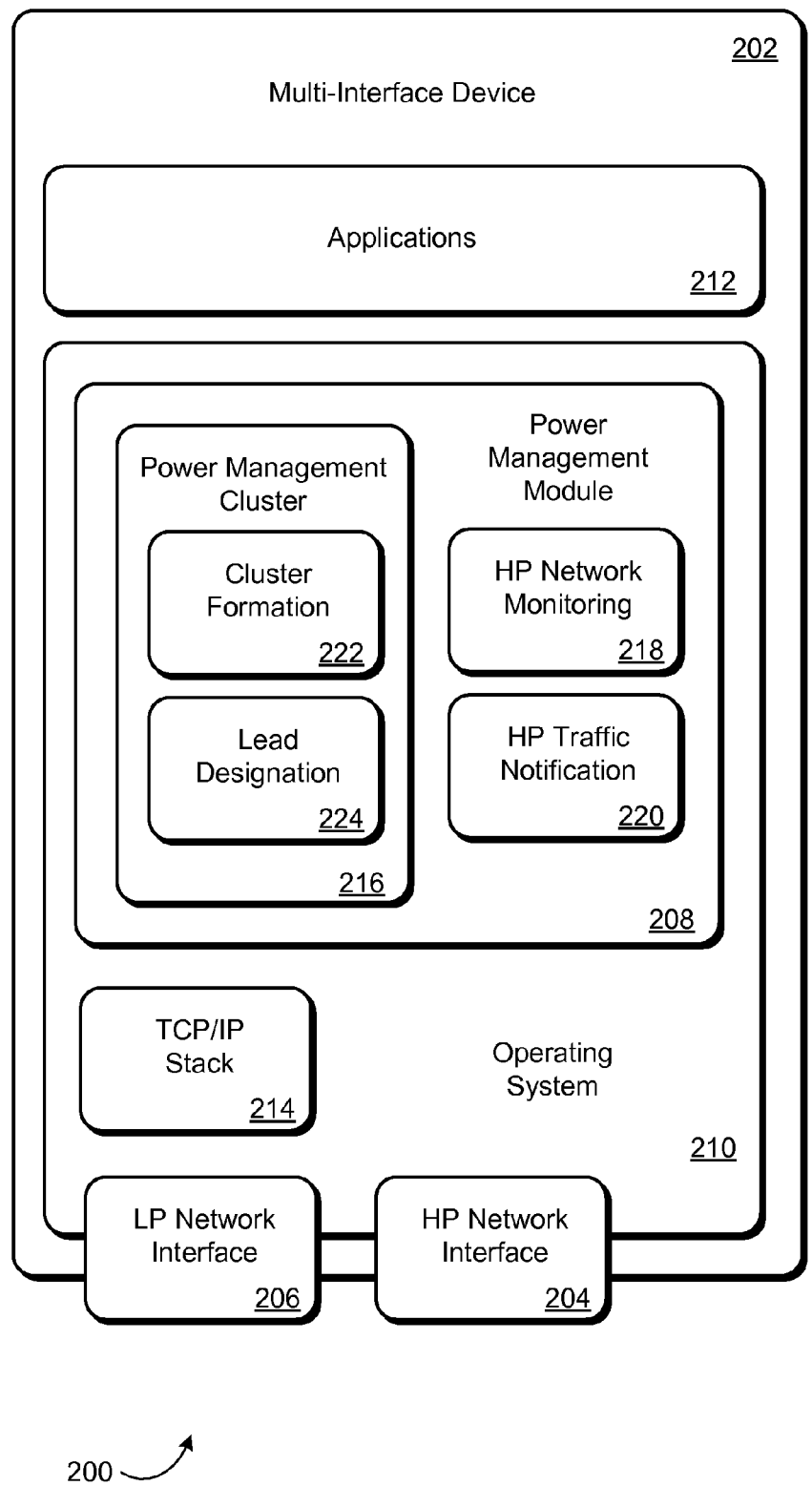
FIG. 2 is a block diagram depicting an example computing device architecture in accordance with an embodiment of the invention.

In an embodiment of the invention, modification of network infrastructure such as the high-power network AP 104 (FIG. 1) is unnecessary, instead, computing devices such as the devices 106, 108, 110, 112, 114, 116 may incorporate a power management module, for example, to facilitate formation and advantageous operation of power management clusters. A design that avoids infrastructure modification may be a significant practical advantage since responsibility for feature availability shifts from infrastructure providers to device providers. FIG. 2 depicts an example system architecture 200 for a multi-interface device 202 in accordance with an embodiment of the invention. The multi-interface device 202 includes a high-power (HP) network interface 204 and a low-power (LP) network interface 206, as well as a power management module 208.

In the example system architecture 200 shown in FIG. 2, the power management module 208 is incorporated in an operating system 210 of the multi-interface device 202. However, each embodiment of the invention are not so limited, for example, a module corresponding to the power management module 210 may be incorporated in an application of the multi-interface device 202, for example, in one of the applications 212. The operating system 210 further incorporates a transmission control protocol and internet protocol (TCP/IP) stack 214. The power management module 208 and the applications 212 may access the high-power network interface 204 and the low-power network interface 206 through the operating system 210 and/or the TCP/IP stack 214. Embodiments of the invention are not limited to TCP/IP, and may utilize any suitable communications protocol.

The multi-interface device 202 is a computing device that may include one or more processing units capable of executing instructions to perform tasks, as well as one or more types of computer-readable media such as volatile and/or non-volatile memory capable of storing data, computer programs and/or computer program components. Such computer programs and components may include executable instructions, structured data and/or unstructured data organized into modules, routines and/or any suitable programmatic object. Such computer programs and components may be created by and/or incorporate any suitable computer programming language. The multi-interface device 202 may include a wide variety of input/output (I/O) devices not shown in FIG. 2 such as keyboards, keypads, touchpads, mice, trackballs, pens, joysticks, gamepads, scanners, cameras, microphones, monitors, liquid crystal displays (LCDs), light emitting diodes (LEDs), printers and/or speakers. Examples of computer-readable media suitable for reading by the multi-interface device 202 include magnetic media such as hard disks, optical media such as compact disks (CDs), communication media such as copper wire, coaxial cable and optical fiber, as well as wireless communication media such as electromagnetic media including radio, microwave, infra-red and laser light.

For clarity, embodiments of the invention may be described herein with reference to symbolic operations such as those of a computer programming language. Such symbolic operations and any data that they act upon correspond to physical states of components and changes in components of computing devices such as the multi-interface device 202 in a manner well understood by one of skill in the art. In an embodiment of the invention, each such operation and its associated data may be fully implemented in hardware.

The high-power network interface 204 may provide access to any suitable high-power network, such as those described above with reference to FIG. 1. Similarly, the low-power network 206 may provide access to any suitable low-power network. The high-power network interface 204 and the low-power network interface 206 need not be physically separate, although, in an embodiment of the invention, each network interface 204, 206 is capable of being activated and inactivated independent of the other, that is, the high-power network interface 204 may be active when the low-power network interface 206 is inactive and vice versa. In an embodiment of the invention, an inactive network interface utilizes less power than an active network interface, for example, a network interface to a wireless network may turn off its radio when inactive and/or transition to a low power mode of operation such as a sleep mode. Although FIG. 2 shows only two network interfaces 204, 206, each embodiment of the invention is not so limited, and different network interfaces may, at times, play the role of the high-power network interface 204 and the low-power network interface 206.

The power management module 208 may include a power management cluster module 216, a high-power (HP) network monitoring module 218, and a high-power (HP) traffic notification module 220. In an embodiment of the invention, the power management cluster module 216 facilitates formation and maintenance of power management clusters such as the power management cluster 118 of FIG. 1. The power management cluster module 216 may include a cluster formation module 222 and a lead designation module 224. It will be helpful to reference the mobile VoIP service example while describing various modules of the multi-interface device 202.

Suppose the device 116 of FIG. 1 has the system architecture 200 of the multi-interface device 202 of FIG. 2, and in particular, incorporates a module corresponding to the power management module 208. The device 116 may enter a service area of a high-power network such as the high-power network footprint 102, and seek to join a power management cluster such as the power management cluster 118 in order to manage power expenditure. In an embodiment of the invention, discovery of a power management cluster is required prior to joining. For example, the power management cluster module 216 may be utilized by the device 116 to discover the power management cluster 118.

As described above with reference to FIG. 1, the power management cluster 118 may incorporate one or more low-power networks among the devices 106, 108, 110, 112, 114 of the cluster 118. Protocols associated with such low-power networks may incorporate facilities for network discovery, for example, networks in accordance with a Bluetooth® networking standard incorporate facilities for discovery of network participants. However, in an embodiment of the invention, the structure of the power management cluster 118 is leveraged to bypass low-power network discovery mechanisms which may be slow and/or resource inefficient.

As depicted in FIG. 1, the power management cluster 118 has a lead device 106 that participates in both a low-power network associated with the cluster 118 and the high-power network associated with the high-power network AP 104. Instead of discovering the power management cluster 118 by discovering an associated low-power network, the device 116 may discover the power management cluster 118 by discovering the lead device 106 of the power management cluster 118 through the participation of the lead device 106 in the high-power network. For example, the high-power network may be a network in accordance with an IEEE® 802.11 standard, and the device 116 may discover current participants of the high-power network with a suitable broadcast message.

Having discovered participants of the high-power network, the device 116 (FIG. 1) may send each a Power Management Cluster Query message. In an embodiment of the invention, those participants that reply are lead devices of a power management cluster such as the lead device 106 of the power management cluster 118. Lead devices such as the lead device 106 that reply may reply with a Power Management Cluster Configuration message. The Power Management Cluster Configuration message may include configuration data, for example, sufficient to enable the device 116 to join the power management cluster 118 and, in particular, a low-power network thereof. This and other power management cluster discovery protocols may be performed by the power management cluster module 216, for example, of the device 116 and the lead device 106.

The seeking device 116 (FIG. 1) may discover a suitable power management cluster to join or the discovery process may fail. Either case may be handled by the cluster formation module 222 (FIG. 2). In the case that a suitable power management cluster is discovered, sufficient information is available to enable the cluster formation module 222 to initiate a cluster join operation. The cluster formation module 222 may utilize any suitable peer-to-peer (P2P) networking and/or self-organizing overlay network mechanisms to implement the cluster join operation or other cluster formation operation. In particular, the cluster formation module 222 may maintain a database of information about the power management cluster 118 and its participants 106, 108, 110, 112, 114.

The cluster join operation may not succeed. For example, the join request may be rejected on security grounds such as an insufficient trust relationship with existing participants 106, 108, 110, 112, 114 (FIG. 1) of the power management cluster 118. In that case, or in the case that a suitable power management cluster is not discovered, the seeking device 116 may instead instantiate a new power management cluster (not shown in FIG. 1) and designate itself as the lead device of the new cluster.

As a default, participants 108, 110, 112, 114 (FIG. 1) of the power management cluster 118, other than a designated lead device such as the lead device 106, may leave their high-power network interface 204 (FIG. 2) inactive when not explicitly accessing the associated high-power network in order to reduce power expenditure. Each participant 108, 110, 112, 114 of the power management cluster 118, other than a designated lead device, effectively obtains the benefit of an active high-power network interface 204 without paying the cost in terms of power expenditure. However, designated lead devices do pay that cost. In order to reduce the power burden on any one participant 106, 108, 110, 112, 114 in the power management cluster 118, the role of lead device may be shared among the participants 106, 108, 110, 112, 114.

For example, each participant 106, 108, 110, 112, 114 (FIG. 1) may serve as lead device for a period of time (the Cluster Lead Duty Period) and then designate a different participant 106, 108, 110, 112, 114 as lead device. Lead scheduling may be performed by the lead designation module 224 (FIG. 2). Any suitable scheduling technique may be utilized. For example, the scheduling may be round-robin so that no cluster participant 106, 108, 110, 112, 114 serves twice before each participant 106, 108, 110, 112, 114 has served once. The scheduling may be at random. Each cluster participant 106, 108, 110, 112, 114 may have an equal or similar probability of being designated lead device. However, each embodiment of the invention is not so limited, and varying the probability of being designated lead device on a per participant 106, 108, 110, 112, 114 basis may be advantageous for the power management cluster 118 considered as a whole.

The probability of being designated lead device (i.e., the lead designation probability) may be based on an amount of time a particular participant has previously served as lead device (i.e., the elapsed lead service time). For example, the lead designation probability may be inversely proportional to the elapsed lead service time. The lead designation probability may be based on a residual power of a cluster participant 106, 108, 110, 112, 114 (i.e., the power remaining in a power supply of the participant). For example, the lead designation probability may be proportional to the residual power of the cluster participant 106, 108, 110, 112, 114 (FIG. 1). A cluster participant 106, 108, 110, 112, 114 with an unlimited power supply may be considered to have a residual power of 100% or some value indicative of its unlimited status. The lead designation probability may be based on a mobility pattern of one or more cluster participants 106, 108, 110, 112, 114. For example, the lead designation probability may be higher for cluster participants 106, 108, 110, 112, 114 that are determined to be less likely to leave the power management cluster 118 due to physical motion. Stationary is an example of a mobility pattern. The lead designation probability may be based on a combination of factors, such as the factors described above.

In an embodiment of the invention, a primary duty of the lead device 106 (FIG. 1) of the power management cluster 118 is to maintain a high-power network connection, such as the connection between the lead device 106 and the high-power network AP 104, in order to monitor the high-power network AP 104 for incoming messages addressed to any participant 106, 108, 110, 112, 114 of the power management cluster 118 (i.e., to monitor for the cluster). Such monitoring may be performed by the high-power network monitoring module 218 (FIG. 2). Any suitable network monitoring technique may be utilized by the power network monitoring module 218. For example, some networks broadcast notifications of incoming messages for registered network interfaces (e.g., the high-power network interface 204), so that the high-power network monitoring module 218 of the lead device 106 may monitor for the cluster by filtering high-power network broadcast messages against a set of network addresses including network addresses corresponding to each participant 106, 108, 110, 112, 114 of the power management cluster 118, rather than only those network addresses corresponding to the lead device 106.

Having detected an incoming message at the high-power network AP 104 (FIG. 1) for one of the cluster participants 106, 108, 110, 112, 114, the lead device 106 may notify the appropriate participant 106, 108, 110, 112, 114 of the incoming message. The high-power traffic notification module 220 (FIG. 2) of the lead device 106 may perform the notification. Any suitable notification mechanism may be incorporated into the high-power traffic notification module 220. For example, the high-power traffic notification module 220 at the lead device 106 may relay a broadcast incoming message notification from the high-power network AP 104 to the high-power traffic notification module 220 of the appropriate cluster participant 106, 108, 110, 112, 114 through a low-power network of the power management cluster 118.

The high-power traffic notification module 220 of the device 106, 108, 110, 112, 114 (FIG. 1) receiving the notification may pass the notification to an appropriate application of the applications 212. For example, if the incoming message is associated with an incoming VoIP call, the notification may be passed to a VoIP client application. In an embodiment of the invention, the incoming message notification includes sufficient information to enable the recipient device 106, 108, 110, 112, 114 to establish a high-power network connection to the high-power network AP 104 to retrieve the incoming message. In an embodiment of the invention, incoming message notifications addressed to the lead device 106 need not be intercepted by the power management module 208 since the high-power network interface 204 is already active and the connection with the high-power network AP 104 already exists.

Having described the system architecture 200 (FIG. 2) of the multi-interface device 202 incorporating the power management module 208, it will be helpful to describe in more detail steps that may be performed in accordance with an embodiment of the invention, for example, by the power management module 208.

Figure 3:
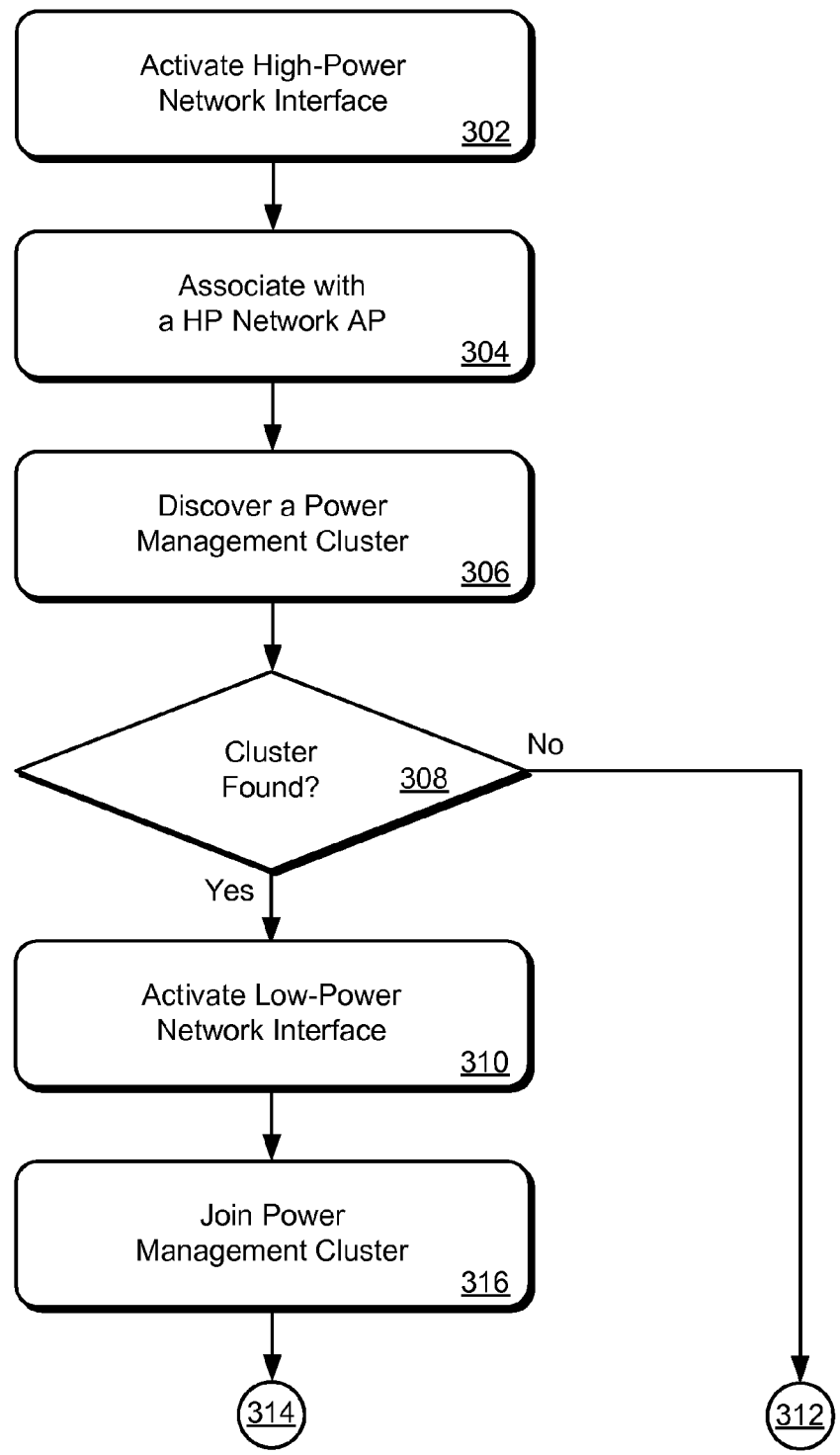
FIG. 3 is a flowchart depicting example steps for joining a power management cluster in accordance with an embodiment of the invention.
Figure 4:
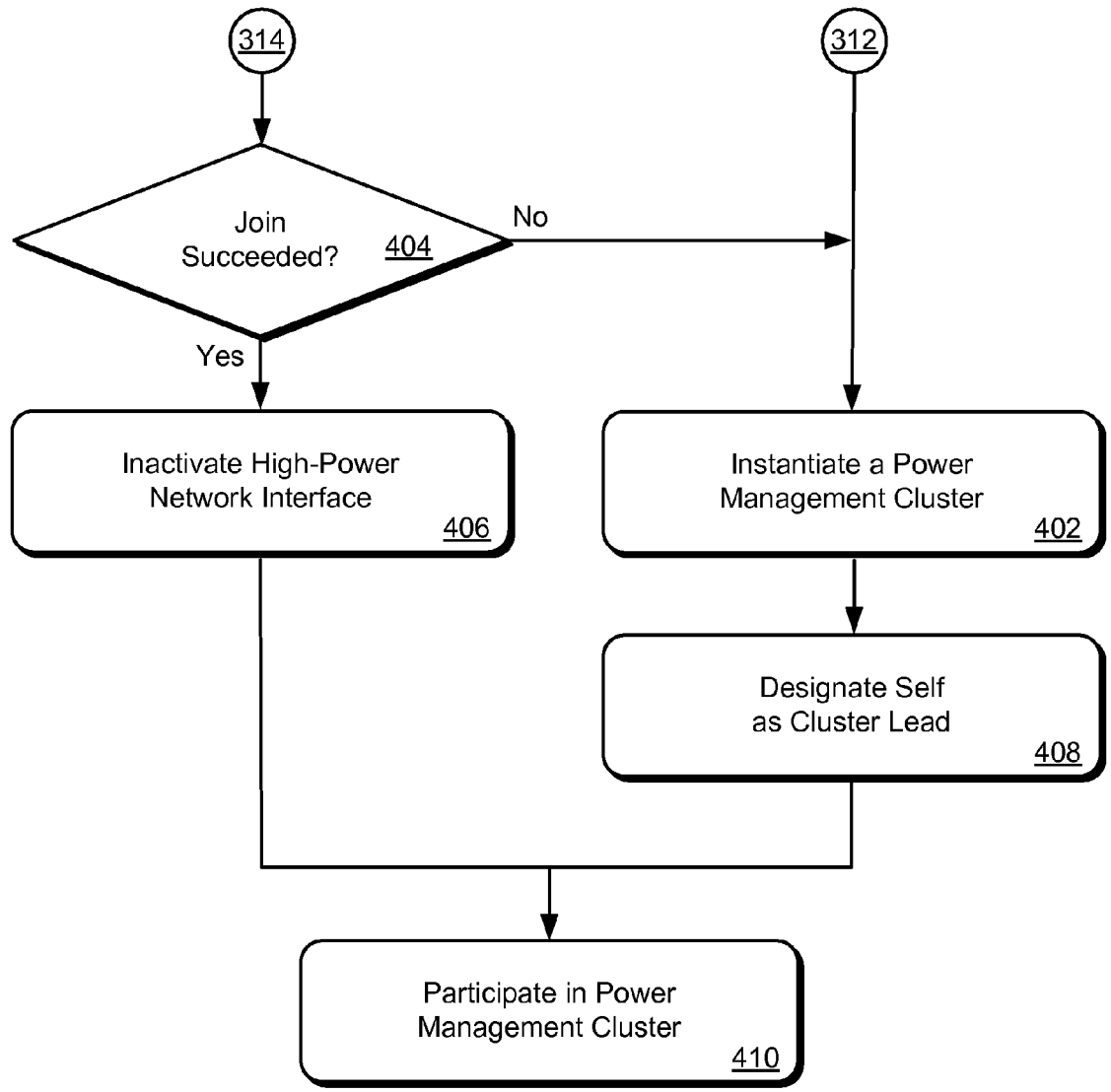
FIG. 4 is a flowchart depicting further example steps for joining a power management cluster in accordance with an embodiment of the invention.

FIG. 3 and FIG. 4 depict example steps and/or a procedure that may be performed to join the power management cluster 118 (FIG. 1) in accordance with an embodiment of the invention. Again, consider the example scenario of the device 116 attempting to join a power management cluster such as the power management cluster 118, and suppose the device 116 to have a system architecture corresponding to the system architecture 200 (FIG. 2). Assume that, as an initial state, both the high-power network interface 204 and the low-power network interface 206 are inactive to reduce power expenditure.

At step 302 (FIG. 3), the high-power network interface 204 (FIG. 2) may be activated. As described above with reference to FIG. 2, in an embodiment of the invention, discovery of power management clusters such as the power management cluster 118 (FIG. 1) is advantageously performed through a high-power network in which a lead device such as the lead device 106 of the power management cluster 118 participates. At step 304, the high-power network interface 204 may associate with a high-power network AP such as the high-power network AP 104. In an embodiment of the invention, association with the high-power network AP 104 effectively connects the device 116 to the high-power network associated with the high-power network AP 104, thereby enabling the next step 306.

At step 306, the power management cluster 118 (FIG. 1) may be discovered, for example, by the device 116. In an embodiment of the invention, discovery of the power management cluster 118 includes broadcasting a Power Management Cluster Query message over the high-power network and waiting for a reply from a lead device of the power management cluster 118 such as the lead device 106. Example steps for discovering a power management cluster such as the power management cluster 118 in accordance with an embodiment of the invention are described below in more detail with reference to FIG. 5. At step 308, it may be determined if the power management cluster 118 was found (i.e., discovered). For example, the device 116 may receive a Power Management Cluster Configuration message from the lead device 106 of the power management cluster 118 through the high-power network. If the power management cluster 118 was found, the procedure may progress to step 310. Otherwise, the procedure may progress to step 402 of FIG. 4. The circles labeled 312 and 314 are diagrammatic connectors serving to connect the flowchart of FIG. 3 with the flowchart of FIG. 4 at like-numbered connection points.

Having found the power management cluster 118 (FIG. 1), the device 116 may prepare to join the power management cluster 118. At step 310, the low-power network interface 206 (FIG. 2) may be activated. At step 316, the device 116 may attempt to join the power management cluster 118. For example, the device 116 may utilize information contained in the Power Management Cluster Configuration to attempt to join a low-power network of the power management cluster 118 through the low-power network interface 206 activated at step 310. As a further, more specific, example, the device 116 may send messages to one or more cluster participants 106, 108, 110, 112, 114 requesting a peer-to-peer network connection.

As described above, however, the attempt to join the power management cluster 118 (FIG. 1) may not succeed. At step 404 (FIG. 4), it may be determined if the attempt to join the power management cluster 118 did succeed. For example, the device 116 may receive an explicit join succeeded or join failed message from one of the cluster participants 106, 108, 110, 112, 114, or a timeout period may elapse without receiving confirmation that the attempt has succeeded. If it is determined that the attempt has succeeded, the procedure may progress to step 406. Otherwise, the procedure may progress to step 402. Having joined the power management cluster 118, the power expenditure require to keep the high-power network interface 204 (FIG. 2) is no longer required, so that, at step 406, the high-power network interface 204 may be inactivated.

However, if a suitable power management cluster could not be found or successfully joined, then, at step 402, a new power management cluster may be instantiated. For example, the device 116 (FIG. 1), having failed to find or join the power management cluster 118, may instantiate a new power management cluster having itself as the sole participant. At step 408, the sole participant of the new power management cluster may designate itself as the lead device of the cluster. For example, the device 116 may take on the responsibilities of a lead device such as responding to Power Management Cluster Query messages.

Having successfully joined or instantiated a power management cluster, at step 410, the device 116 (FIG. 1) may participate in the power management cluster. Participating in the power management cluster may include participating in a low-power network of the power management cluster, receiving notifications of incoming messages at the high-power network AP 104, participating in cluster lead designation, and, if designated as a cluster lead, monitoring the high-power network AP 104 for incoming messages for any cluster participant 106, 108, 110, 112, 114, notifying cluster participants of incoming messages, and responding to cluster discovery attempts.

Figure 5:
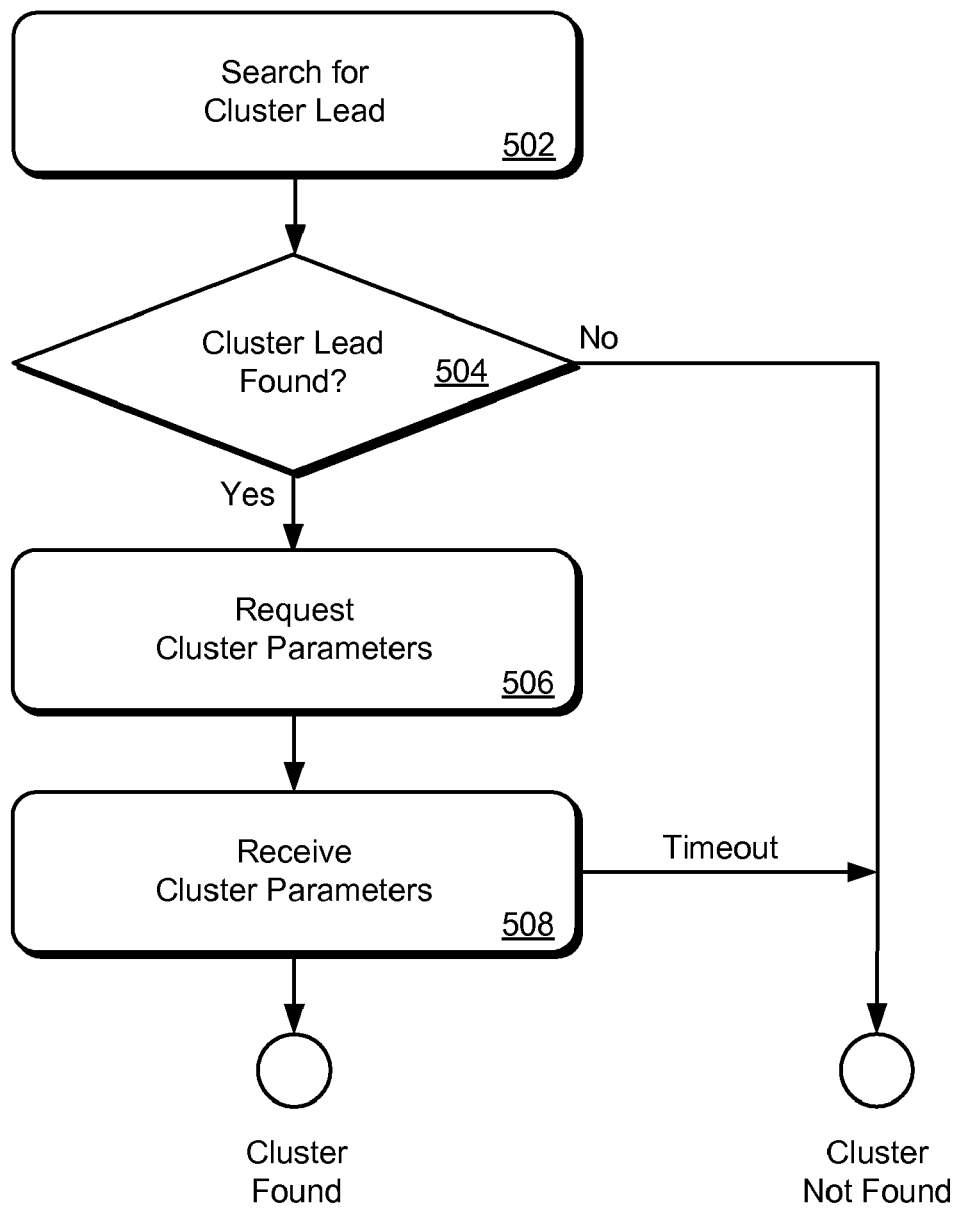
FIG. 5 is a flowchart depicting example steps for discovering a power management cluster in accordance with an embodiment of the invention.

Before describing cluster lead designation in more detail, it will be helpful to describe further aspects of power management cluster discovery. FIG. 5 depicts example steps and/or a procedure for power management cluster discovery in accordance with an embodiment of the invention. At step 502, a search for a lead device of the power management cluster 118 (i.e., the cluster lead), such as the lead device 106 (FIG. 1), may be conducted. For example, as described above, the searcher may broadcast the Power Management Cluster Query message. At step 504, it may be determined if a cluster lead was found. For example, the search of step 502 may include receiving a response to the Power Management Cluster Query message from one or more cluster leads, and it may be determined that a cluster lead was found if such responses are received within a timeout period. If it is determined that a cluster lead was found, the procedure may progress to step 506. Otherwise, it may be determined that a suitable power management cluster such as the power management cluster 118 was not found, and the procedure may progress, for example, to step 402 of FIG. 4.

In some embodiments of the invention, the response to the Power Management Cluster Query message may include sufficient information to attempt a power management cluster join operation, and the power management cluster may be considered found. However, in one or more alternate embodiments of the invention, further information is required to attempt the power management cluster join operation and, at step 506, the further information may be requested, for example, from one of the cluster participants 106, 108, 110, 112, 114 (FIG. 1). The request for further information need not be directed to a lead device of the power management cluster 118, such as the lead device 106, and may be sent through the low-power network interface 206 (FIG. 2), rather than the high-power network interface 204. At step 508, a response to the request may be received. Upon successful receipt of the response, the power management cluster 118 may be considered found, and the procedure may progress, for example, to step 310 of FIG. 3. If, for some reason, a response is not received within a timeout period, the request may be repeated, or it may be determined that a suitable power management cluster cannot be found.

Figure 6:
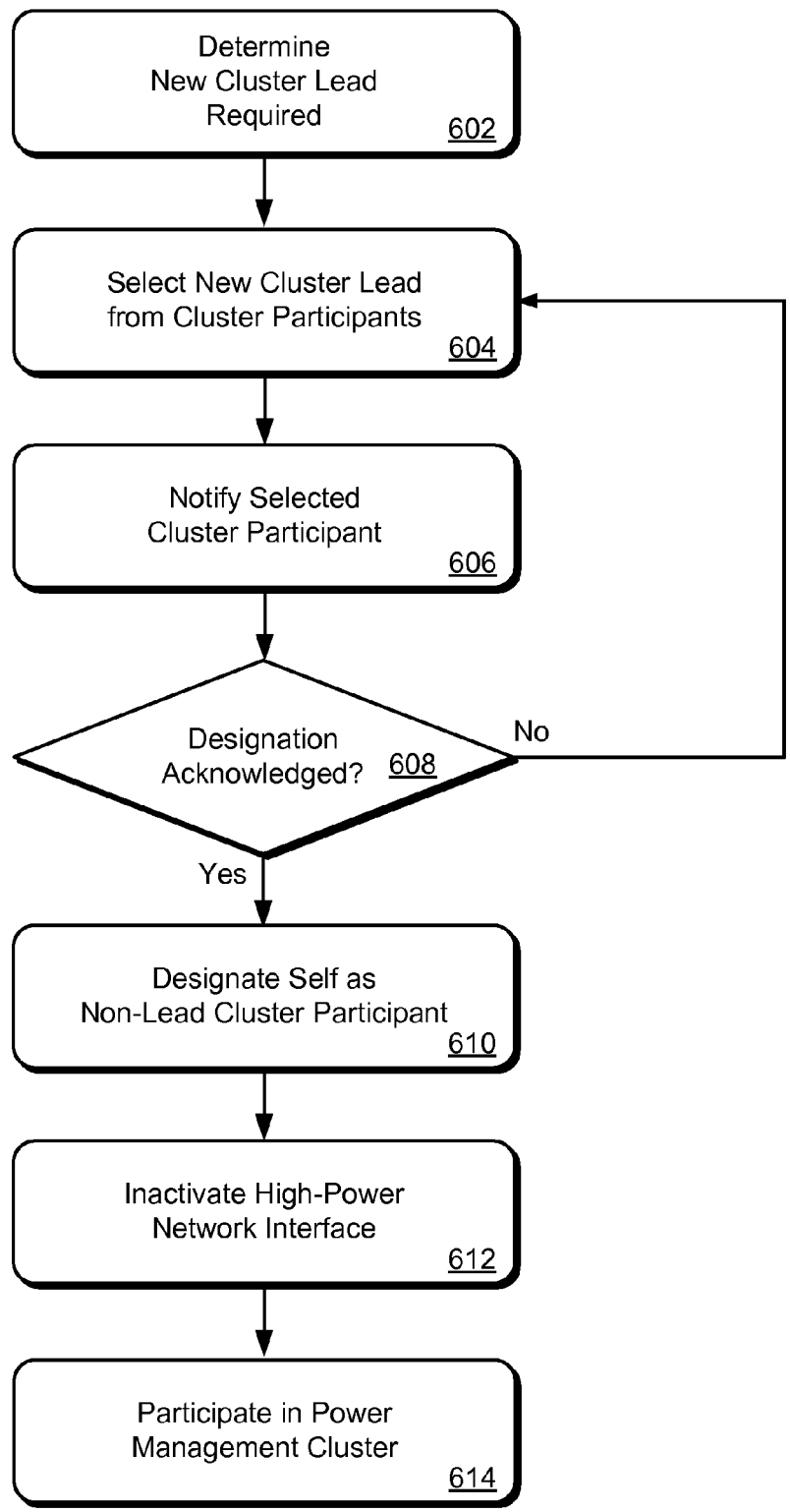
FIG. 6 is a flowchart depicting example steps for designating a power management cluster lead device in accordance with an embodiment of the invention.

FIG. 6 depicts example steps and/or a procedure for designating a power management cluster lead device (i.e., cluster lead designation) in accordance with an embodiment of the invention. In an embodiment of the invention, each power management cluster 118 (FIG. 1) has at least one lead device 106. The power management module 208 (FIG. 2) of the lead device 106 may perform the steps 602, 604, 606, 608, 610, 612, 614 depicted in FIG. 6. At step 602, it may be determined that a new cluster lead is required. For example, the Cluster Lead Duty Period of the current lead device 106 may elapse, or a power supply of the current lead device 106 may drop below a threshold.

At step 604, a new cluster lead may be selected from among cluster participants 108, 110, 112, 114 (FIG. 1). As described above, the new cluster lead may be selected in round-robin fashion and/or at random, and the probability of each cluster participant 108, 110, 112, 114 being selected need not be equal, but may depend on one or more factors. Having selected a new cluster lead, the current cluster lead 106 may notify the candidate at step 606. For example, the current lead device 106 may send a Power Management Cluster Lead Designation message to the candidate through a low-power network of the power management cluster 118.

The candidate need not accept the designation as a cluster lead. For example, the candidate may not have sufficient resources to fulfill the lead device role. The candidate may respond to the Power Management Cluster Lead Designation message with a Power Management Cluster Lead Designation Acknowledge (Ack) message or a Power Management Cluster Lead Designation Not-Acknowledge (Nack) message. At step 608, it may be determined, for example, by the current lead device 106 (FIG. 1), if the candidate has accepted the designation as a cluster lead. For example, the current lead device 106 may receive the Ack message, the Nack message, or timeout waiting for a response to the Power Management Cluster Lead Designation message. If it is determined that the candidate has accepted the designation as a cluster lead (e.g., the current lead receives the Ack message), then the procedure may progress to step 610. Otherwise, the procedure may return to step 604 to select a different candidate.

Before acknowledging the designation as cluster lead, the candidate may active its high-power network interface 204 (FIG. 2), establish a high-power network connection, for example to the high-power network AP 104 (FIG. 1), and configure its power management module 208 for a cluster lead mode. In an embodiment of the invention, once the new designation is acknowledged, the current cluster lead 106 may surrender the role of cluster lead. At step 610, the current lead 106 may self designate as a non-lead cluster participant. For example, the power management module 208 of the current lead 106 may be reconfigured for a non-lead or ordinary cluster participant mode. At step 612, the now ordinary cluster participant 106 may inactivate its high-power network interface 204 and sever corresponding high-power network connections such as the high-power network connection between the device 106 and the high-power network AP 104. At step 614, the device 106 may participate in the power management cluster 118 as an ordinary cluster participant, for example, as described above for step 410 (FIG. 4).

The invention claimed is:

1. A computing device configured to participate in a power management cluster, the computing device comprising:
   a high-power network interface;
   a low-power network interface;
   a power management module comprising:
      a power management cluster module configured to, at least, connect to at least one other computing device of a plurality of devices in the power management cluster through the low-power network interface so that the connected computing devices participate in a low-power peer-to-peer network via the low-power network interface, each of the plurality of devices has a probability of being designated as the lead device, the probability based on at least one of: an amount of time a device has previously served as the lead device, a residual power of the device, or a mobility pattern of the device;
      a lead designation module configured to, at least, designate at least one of the devices participating in the network as the lead device of the power management cluster; and
      a high-power network monitoring module configured to, at least, connect to a high-power network access point through the high-power network interface in response to being designated lead device of the power management cluster such that the lead device is in communication with the high-power network and the low-power peer-to-peer network.

2. The computing device of claim 1, wherein:
   each device in the plurality of devices has a same probability of being designated as the lead device.

3. The computing device of claim 1, wherein:
   the high-power network monitoring module is further configured to, at least monitor the high-power network access point for incoming messages addressed to any device in the plurality of devices; and
   the power management module further comprises a high-power traffic notification module configured to, at least, notify devices of the plurality of devices, through the low- power network interface, of incoming messages at the high-power network access point.

4. The computing device of claim 1, wherein the probability of being designated as the lead device is based on a combination of the amount of time the device has previously served as the lead device, the residual power of the device, and the mobility pattern of the device.

5. The computing device of claim 1, wherein a default mode of operation for the high-power network interface is inactive for each device not designated as the lead device.

6. The computing device of claim 1, further comprising:
   when the probability of being designated as the lead device is based on the amount of time the device has previously served as the lead device, the probability is inversely proportional to the elapsed time previously served as the lead device;
   when the probability of being designated as the lead device is based on the residual power of the device, the probability is proportional to the residual power; and
   when the probability of being designated as the lead device is based on the mobility pattern of the device, the probability is higher for a device determined to be less likely to leave the power management cluster due to physical motion than for the device determined to be more likely to leave the power management cluster.

7. A computer-readable data storage medium having thereon computer executable instructions for power management comprising:
   designating at least one device as a lead device of a power management cluster; participating, at least temporarily, as the lead device in the power management cluster, the power management cluster comprising:
      a low-power peer-to-peer network of a plurality of devices, each one of the devices having a set of network interfaces comprising a high-power network interface and a low-power network interface, and each one of the devices in the low-power peer-to-peer network connected to at least one other device of the plurality of devices of the power management cluster through its low-power network interface, each of the plurality of devices has a probability of being designated as the lead device, the probability based on at least one of an amount of time a device has previously served as the lead device, a residual power of the device, or a mobility pattern of the device;
      the lead device designated from among the plurality of devices further connected to a high-power network access point through the high-power network interface, the lead device configured to instantiate the power management cluster; and
   connecting to the high-power network access point through the high-power network interface when designated as the lead device of the power management cluster such that the lead device is in communication with the high-power network and the low- power peer-to-peer network.

8. The computer-readable data storage medium of claim 7, wherein a default mode of operation for the high-power network interface of each non-lead device is inactive.

9. The computer-readable data storage medium of claim 7, wherein a non-lead device connects to the high-power network access point through its high-power network interface in response to receiving a message from the lead device.

10. The computer-readable data storage medium of claim 7, wherein the probability of being designated as the lead device is based on a combination of the amount of time the device has previously served as the lead device, the residual power of the device, and the mobility pattern of the device.

11. The computer-readable data storage medium of claim 7 further comprising:
when the probability of being designated as the lead device is based on the amount of time the device has previously served as the lead device, the probability is inversely proportional to the elapsed time previously served as the lead device;
when the probability of being designated as the lead device is based on the residual power of the device, the probability is proportional to the residual power; and
when the probability of being designated as the lead device is based on the mobility pattern of the device, the probability is higher for a device determined to be less likely to leave the power management cluster due to physical motion than for the device determined to be more likely to leave the power management cluster.
when the probability of being designated as the lead device is based on the mobility pattern of the device, the probability is higher for a device determined to be less likely to leave the power management cluster due to physical motion than for the device determined to be more likely to leave the power management cluster.

12. A computer-implemented method of power management, the method comprising:
discovering a power management cluster comprising a plurality of devices forming a low-power peer-to-peer network, each one of the plurality of devices having a high-power network interface and a low-power network interface, and being connected to at least one other device of the plurality of devices through its low-power network interface, each of the plurality of devices has a probability of being designated as the lead device, the probability based on at least one of: an amount of time a device has previously served as the lead device, a residual power of the device, or a mobility pattern of the device;
joining the power management cluster through the low-power network interface;
when one of the plurality of devices is designated as a lead device of the power management cluster, connecting to a high-power network access point through the high-power network interface such that the lead device is in communication with the high-power network and the low-power network and configured to instantiate the power management cluster; and
when one of the plurality of devices is designated as a non-lead device of the power management cluster, having a probability of later being designated as the lead device.

13. The computer-implemented method of claim 12, wherein discovering the power management cluster comprises discovering the lead device of the power management cluster.

14. The computer-implemented method of claim 13, wherein discovering the lead device of the power management cluster comprises searching for the lead device of the power management cluster through the high-power network interface.

15. The computer-implemented method of claim 13, wherein:
discovering the power management cluster further comprises receiving low- power network configuration information through the high-power network interface.

16. The computer-implemented method of claim 12, further comprising participating in designating a new lead device of the power management cluster.

17. The computer-implemented method of claim 12, further comprising monitoring the high-power network access point for incoming messages addressed to any device in the power management cluster.

18. The computer-implemented method of claim 12, further comprising connecting to the high-power network access point through the high- power network interface if notified of an incoming message by the lead device.

19. The computer-implemented method of claim 12, wherein the probability of being designated as the lead device is based on a combination of the amount of time the device has previously served as the lead device, the residual power of the device, and the mobility pattern of the device.

20. The computer-implemented method of claim 12, further comprising:
when the probability of being designated as the lead device is based on the amount of time the device has previously served as the lead device, the probability is inversely proportional to the elapsed time previously served as the lead device;
when the probability of being designated as the lead device is based on the residual power of the device, the probability is proportional to the residual power; and
when the probability of being designated as the lead device is based on the mobility pattern of the device, the probability is higher for a device determined to be less likely to leave the power management cluster due to physical motion than for the device determined to be more likely to leave the power management cluster.

* * * * *